United States Patent Office 3,151,811
Patented Oct. 6, 1964

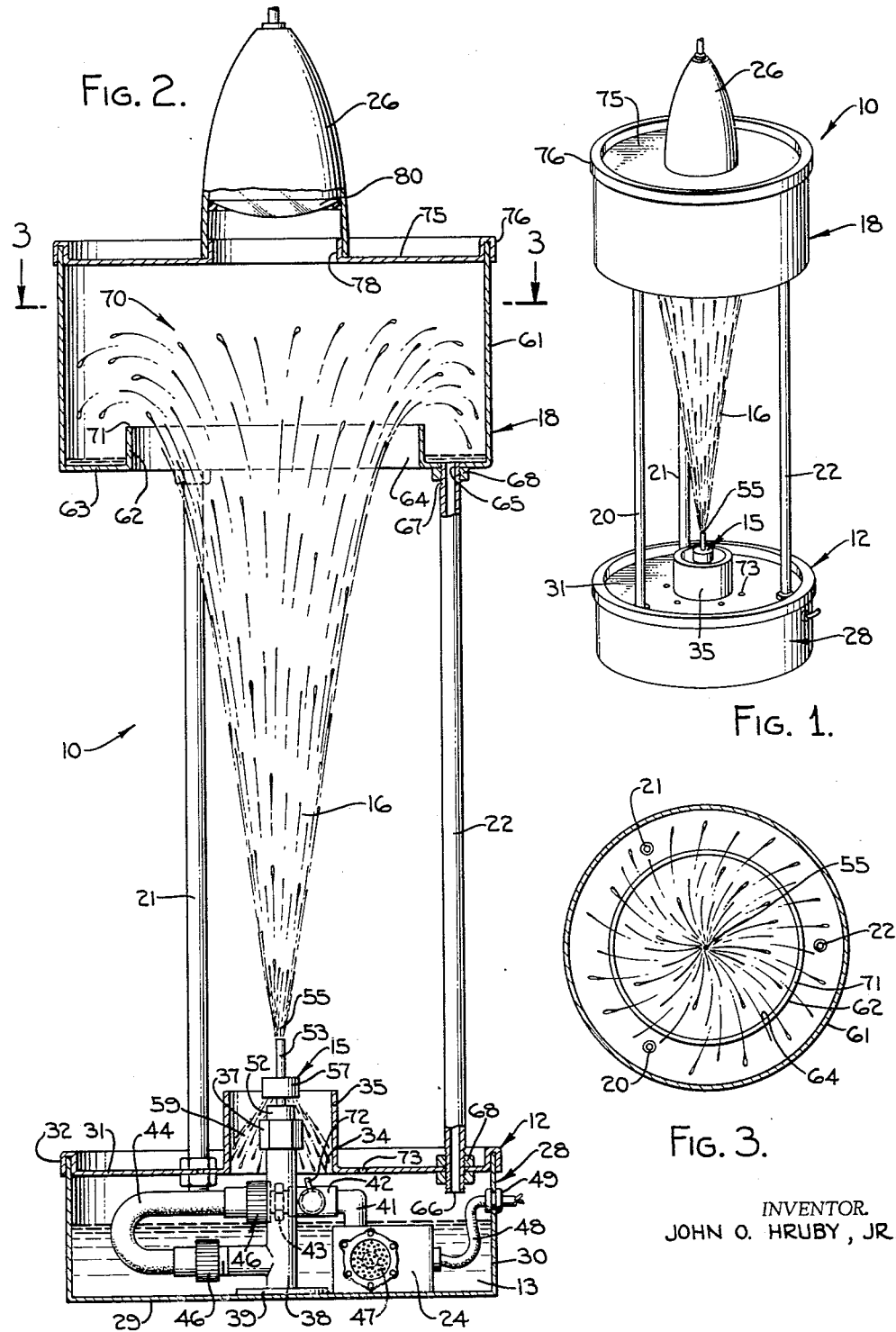
Oct. 6, 1964     J. O. HRUBY, JR     3,151,811
WATER FOUNTAIN APPLIANCE
Filed Feb. 28, 1963     2 Sheets-Sheet 1
INVENTOR.
JOHN O. HRUBY, JR.

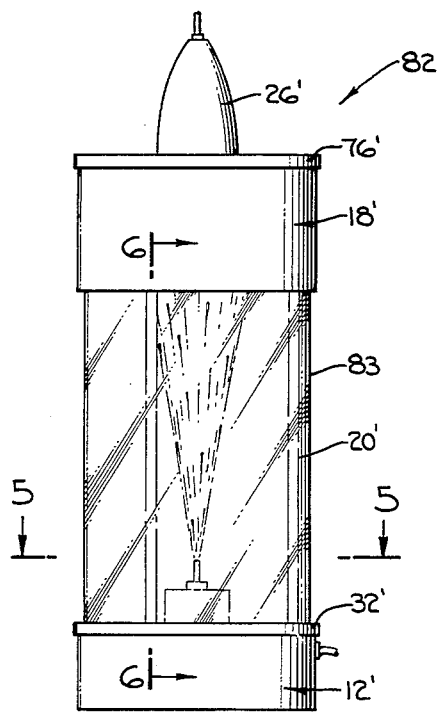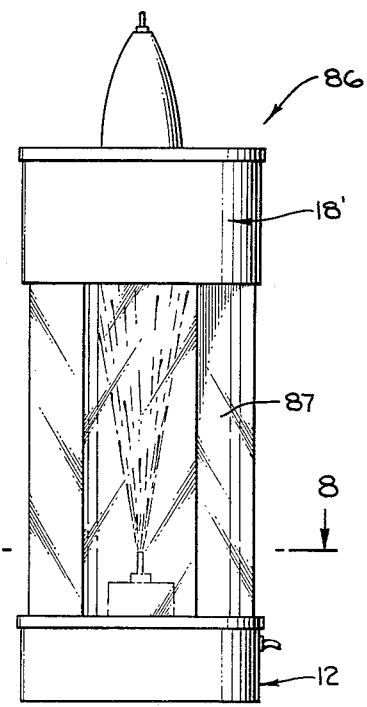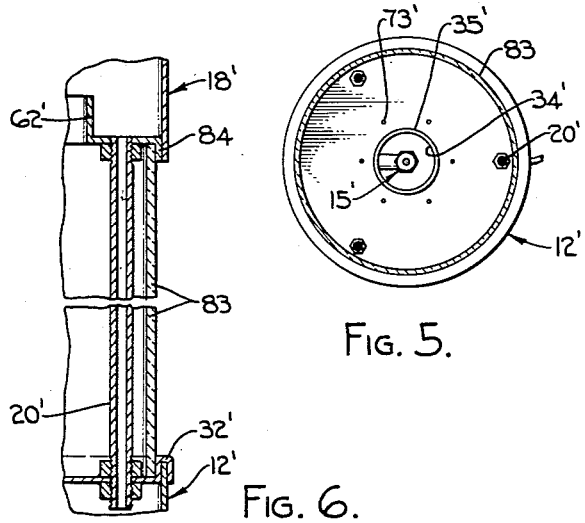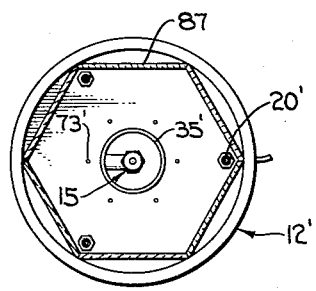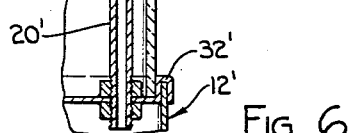

3,151,811
WATER FOUNTAIN APPLIANCE
John O. Hruby, Jr., Burbank, Calif., assignor to Rain Jet Corp., Burbank, Calif., a corporation of California
Filed Feb. 28, 1963, Ser. No. 261,637
6 Claims. (Cl. 239—20)

This invention relates generally to water fountains, and more particularly to an electric appliance for displaying an enclosed water fountain.

The appliances of this invention are suitable for indoor and outdoor uses and are characterized as producing lively water fountains of inverted conical configuration, with the water of the fountain being caught past and slightly below the apogee of the fountain and recirculated to a reservoir for continuous operation. In a preferred embodiment, an appliance of this invention comprises an electric lamp, the light from which is reflected axially into the inverted cone of the fountain producing a striking effect of dynamic sparkles caused by light shining through the myriad of jetted water droplets forming the fountain.

In the following part of this specification the details of construction and mode of operation of a preferred embodiment of the invention with two modifications thereof are described with reference to the accompanying drawing, in which:

FIG. 1 is a perspective view of an appliance of this invention shown in operation;

FIG. 2 is a central vertical section through the appliance on a larger scale;

FIG. 3 is a cross-section taken upon a plane indicated by line 3—3 on FIG. 2;

FIG. 4 is a side elevation of another embodiment of the fountain appliance of this invention;

FIG. 5 is a cross-section through the appliance of FIG. 4 taken upon a plane indicated by line 5—5 on FIG. 4;

FIG. 6 is a detail section taken upon line 6—6 on FIG. 4;

FIG. 7 is a side elevation of still another embodiment according to this invention; and FIG. 8 is a cross-section through the embodiment of FIG. 7 taken upon a plane indicated on FIG. 8 by line 8—8.

Referring to the drawing in greater detail, and in particular to FIGS. 1–3, the electric appliance shown therein is designated generally by reference numeral 10. Viewed broadly, it comprises a base receptacle 12 for containing a supply of water 13; water discharging means 15 for forming a water fountain 16 of inverted conical configuration with the axis of the fountain being vertical and extending upwardly from the discharging means 15; an annular trough 18 for catching the water of the fountain; a plurality of legs 20, 21 and 22 for supporting the trough above the receptacle, at least one of the legs, e.g. 22, being a conduit for returning collected water from the trough to the receptacle, and a pump 24 for forcing water from within the receptacle through the water discharging means 15. The illustrated appliance 10 also comprises a parabolic reflector 26 adapted to contain a light bulb (not shown), the reflector being positioned above the trough 18 to shine. axially into the conical fountain to illuminate the droplets of water of the fountain.

The receptacle 12 comprises a basin 28 having a bottom 29 and a cylindrical side wall 30. A pan 31 spans the top of the basin, the pan having a turned-down rim flange 32 fitting over the upper edge of the side wall of the basin. At its center the pan 31 has an opening 34 defined by an open-ended cylindrical wall projection 35.

The water discharging means 15 is mounted by a nut 37 atop a riser pipe 38 which extends upwardly into the pan opening 34 from a base plate 39 secured upon the base bottom 29. The riser is connected to the pump 24 by a conduit which in the illustrated embodiment comprises a jump outlet elbow 41, a valve 42, a connecting nipple 43, a flexible tube 44, and a side arm 45 of the riser 38, the flexible tube being secured to the nipple 43 and to the side arm 45 by end couplings 46. The pump has a screened inlet 47 for admitting water 13 to the pump from the basin. A waterproofed cord 48 leads from the pump through a grommet 49 in the side wall 30 of the basin for connecting the pump to a nearby electric outlet box (not shown).

The water discharging means 15 for the illustrated embodiment is a fountain producing device of the type disclosed in my copending application, Serial No. 254,398, entitled "Ornamental Water Fountains." As more fully described in that copending application, the herein represented device 15 comprises a tubular body 52 and a tubular stem 53 extending upwardly from within the body. The body 52 receives water from the riser 38 through tangentially directed inlet openings in the body causing swirling of water around in the body and out through a discharge opening at the top of the body around the stem. The swirl of water in the body 52 causes the stem 53 to gyrate around in the body with the axis of the stem being inclined with respect to the vertical and with the stem tracing a geometric surface known as a hyperboloid of one sheet. The stem 53 is open-ended. Water passes into the lower end of the stem directly from the riser 38 and out through an orifice 55 at the upper end of the stem to produce the conical water fountain 16. A collar 57 around the stem and above the body 52 deflects the water from the body around the stem downwardly as spray 59, with the annular projecting wall 35 deflecting the spray 59 back into the basin 28.

The trough 18 is formed of an outer cylindrical wall 61, an inner annular side wall 62 and an annular bottom wall 63, with the inner side wall 62 defining a central circular opening 64. The trough is supported above the receptacle 12 by the legs 20–22 with the center of the trough opening 64 being in vertical alignment with the center of the opening 34 of the receptacle. In the illustrated embodiment each of the legs 20–22 are tubular and open-ended, the upper end opening of leg 22 being designated by reference numeral 65, communicating directly with the space of the trough, and the lower end opening being designated by numeral 66 open to the space within the receptacle whereby water from the trough passes downwardly through the legs 20–22 to the inside of the basin of the receptacle. The legs 20–22 are secured to the bottom wall 63 of the trough and to the pan 31 of the receptacle by screw-thread connections 67 and are locked to their adjusted lengths by nuts 68.

The pump 24 is of a capacity to provide sufficient height to the conical water fountain 16 that the fountain will pass upwardly through the central opening 64 of the trough, reaching its apogee, at a level 70 above the upper end edge or rim 71 of the inner side wall of the trough. The force of water from the pump is controlled by handle 72 of the valve 42, accessible to an operator through the central opening 34 of the receptacle. From the apogee 70 of the conical fountain, the water of the fountain passes radially outward and downward into the trough and thence back to the receptacle 12 for continued recirculation. When operation of the fountain appliance is initiated, some drops of water of the fountain will not reach the level of the trough and will drop down upon the pan 31, and, to return such water to the basin, a plurality of ports 73 is provided in the pan.

A cover 75 is provided for the trough 18, such cover having a reversed rim 76 for fitting snugly upon the upper edge of the side wall 61 of the trough. The cover 75 has a central opening 78 in vertical alignment with the trough opening 64, and the cover supports the electric light reflector 26, provided with a lens 80, whereby light from the reflector shines down axially into the conical fountain 16, illuminating the droplets of water of the fountain and thereby presenting a pleasing reflection and refraction of light as a myriad of sparkles.

Referring to FIGS. 4–6, the embodiment therein illustrated is designated generally by reference numeral 82. It is similar in construction and mode of operation to the appliance 10 of FIGS. 1–3, and its component parts are designated by primed reference numerals which are the same, respectively, as those used for designating corresponding parts of appliance 10. Appliance 82 has a transparent cylindrical shield 83 around the plurality of legs 20' for insuring no loss or splashing of water droplets. In the illustrated embodiment the shield 83 is received at its lower end within the rim flange 32' of the receptacle 28', and at its upper end within a short skirt portion 84 extending downwardly from the periphery of the trough 18'.

The embodiment of FIGS. 7 and 8, designated generally by reference numeral 86, is similar in all respects thereto to appliance 82 of FIGS. 4 and 5, except that it, appliance 86, has its transparent shield 87 of hexagonal cross-section.

While this invention has herein been shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. An appliance for displaying an ornamental water fountain comprising a receptacle for containing a supply of water, water discharging means for forming a water fountain of inverted conical configuration with the axis of the fountain being vertical and extending upwardly from said discharging means whereby the water of the fountain passes radially outward and downward from its apogee, a trough having a central circular opening, means for supporting the trough spaced above said discharging means with the center of the trough being on said axis whereby water from the apogee of the fountain is caught by the trough, a conduit leading from the trough to the receptacle for return of spent fountain water to the receptacle, and means for pumping water from the receptacle to said discharging means.

2. An appliance according to claim 1, and comprising a cylindrical transparent shield of circular cross-section enclosing the space between the trough and the receptacle, and coaxial with the axis of the fountain.

3. An appliance according to claim 1, and comprising a cylindrical transparent shield of hexagonal cross-section enclosing the space between the trough and the receptacle, and coaxial with the axis of the fountain.

4. An electric lamp comprising a basin for containing a supply of water, a trough having a central annular opening defined by an upwardly extending side wall of the trough, means for supporting the trough spaced above the basin, water discharging means supported centrally of the basin for forming a water fountain of inverted conical configuration with the axis of the fountain being vertical and extending upwardly from said discharging means and through the center of said annular opening whereby the water of the fountain passes radially outward and downward from its apogee into the trough, a conduit leading from the trough to the basin for return of spent fountain water to the basin, means for pumping water from the basin to said discharging means, an electric lamp reflector, means for supporting the reflector above the trough with the axis of the reflector being aligned with that of the fountain whereby light is directed by the reflector downwardly into the water fountain to shine through the fountain.

5. An appliance for displaying an ornamental water fountain comprising a basin for containing a supply of water, a pan across the top of the basin, a central opening in the pan, water discharging means extending from the basin into said pan opening for forming a water fountain of inverted conical configuration of predetermined cone angle and with the axis of the fountain being vertical and extending upwardly from said discharging means, a trough having a central annular opening defined by an upwardly extending side wall of the trough, means for supporting the trough spaced above the pan with said annular trough opening and said pan opening being in vertical axial alignment, whereby the fountain passes upwardly through said trough opening with the apogee of the fountain being above the top edge of said side wall of the trough and with the water of the fountain passing radially outward and downward from its apogee into the trough, a conduit leading from the trough to the basin for return of spent fountain water to the basin, and means for pumping water from the basin to said discharging means with sufficient force to cause the fountain apogee to be above said side wall of the trough.

6. An appliance for displaying a water fountain comprising a receptacle for containing a supply of water, a water discharging device on the receptacle and having a tubular stem for producing a fountain of inverted conical configuration with the axis of the fountain being vertical and extending upwardly from said device whereby the water of the fountain passes radially outward and downward from its apogee, a trough having an inside wall defining a central circular opening, means for supporting the trough spaced above said device with the center of the trough opening being on said axis whereby water from the apogee of the fountain is caught by the trough, a conduit for returning water from the trough to the receptacle, and means for pumping water from the receptacle to said device with sufficient force to cause the fountain to pass upwardly through said trough opening.

References Cited in the file of this patent

UNITED STATES PATENTS

| | | |
|---|---|---|
| 1,533,738 | Kane et al. | Apr. 14, 1925 |
| 1,799,852 | Jones | Apr. 7, 1931 |
| 3,022,010 | Barnett | Feb. 20, 1962 |
| 3,030,028 | Hruby | Apr. 17, 1962 |
| 3,081,036 | Hruby | Mar. 12, 1963 |